United States Patent
Kato et al.

[11] Patent Number: 5,953,223
[45] Date of Patent: Sep. 14, 1999

[54] POWER SUPPLY UNIT CAPABLE OF HIGH FREQUENCY SWITCHING FOR POWERING AN IMAGE INDUCTION HEAT FUSING APPARATUS

[75] Inventors: Takeshi Kato, Itami; Mikiyuki Aoki, Toyohashi; Eiji Okabayashi, Toyokawa, all of Japan

[73] Assignee: Minolta Co., Ltd., Osaka, Japan

[21] Appl. No.: 08/768,728

[22] Filed: Dec. 18, 1996

[30] Foreign Application Priority Data

Dec. 19, 1995 [JP] Japan ................................ H 7-330472

[51] Int. Cl.⁶ .................................................. H02M 5/458
[52] U.S. Cl. .................................. 363/69; 363/37; 363/65
[58] Field of Search ................................. 363/15, 34, 37, 363/65, 67, 69, 70, 71, 72

[56] References Cited

U.S. PATENT DOCUMENTS

| | | | |
|---|---|---|---|
| 3,234,450 | 2/1966 | Jennings | 363/71 |
| 3,390,320 | 6/1968 | Kammiller et al. | 363/71 |
| 3,491,250 | 1/1970 | Shoh | 363/71 |
| 4,027,169 | 5/1977 | Lowther | 363/65 |
| 4,323,960 | 4/1982 | Jones | 363/70 |
| 4,330,818 | 5/1982 | Peschel | 363/70 |
| 4,791,528 | 12/1988 | Suzuki et al. | 363/21 |
| 4,916,599 | 4/1990 | Traxler et al. | 363/65 |
| 5,353,215 | 10/1994 | Dinwiddlie et al. | 363/67 |
| 5,532,917 | 7/1996 | Hung | 363/67 |

*Primary Examiner*—Jeffrey Sterrett
*Attorney, Agent, or Firm*—McDermott, Will & Emery

[57] ABSTRACT

This invention is related to a power supply unit used in an image forming apparatus having a induction heat fusing device. In the power supply unit, each of a first and a second rectifying circuits rectifies AC voltage from a power supply to generate DC voltage. An inverter circuit generates a high frequency voltage to be applied to a coil of the induction heat fusing device by switching the DC voltage from the first rectifying circuit. A switching circuit switches the DC voltage from said second rectifying circuit and generates AC voltage. A transformer receives the AC voltage from the switching circuit and outputs a transformed voltage to be apply to a component of the image forming apparatus. The inverter, second rectifying circuit and switching circuit are connected to a common ground line.

12 Claims, 4 Drawing Sheets

POWER SUPPLY UNIT CAPABLE OF HIGH FREQUENCY SWITCHING FOR POWERING AN IMAGE INDUCTION HEAT FUSING APPARATUS

BACKGROUND OF THE INVENTION

1. Field of the Invention

The present invention pertains to a power supply unit used in an image forming device such as a copier or printer, and more particularly to a power supply unit that supplies power to an induction heat fusing apparatus of an image forming device.

2. Description of the Related Art

Due to their simplicity of construction and low cost, halogen lamps are often used as the heat source for the fusing apparatus used in an image forming device such as a copier or printer using the electrophotographic method. However, halogen lamps have the problem that they take a long time to warm up. To solve this problem, a fusing apparatus based on a method using induction heat (induction heat fusing method) has been proposed.

Using this fusing apparatus based on the induction heat fusing method, the heating process takes a relatively short period of time. In this sense, it has an energy saving effect that the heating need not be performed beyond the necessary time. On the other hand, however, an inverter to perform high frequency switching of electric current is necessary.

Image forming devices such as copiers or printers using the electrophotographic method depend on multiple power supply units such as a power supply to provide power to the motors that drive the elements of the image forming device, and a power supply to provide power to the controller (microcomputer) that controls the operations of the elements of the image forming device. If an inverter power supply needed for the induction heat fusing device were separately added to these power supply units already in existence, reduction in size or cost of the image forming device would be hindered.

SUMMARY OF THE INVENTION

In light of the problems described above, an object of the present invention is to provide an improved power supply unit.

Another object of the present invention is to provide a lightweight, compact power supply unit.

Yet another object of the present invention is to provide an inexpensive power supply unit.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference number throughout the several drawings.

DETAILED DESCRIPTION OF THE PREFERRED EMBODIMENTS

Embodiments of the present invention are explained below in detail with reference to the drawings.

Figure 1:
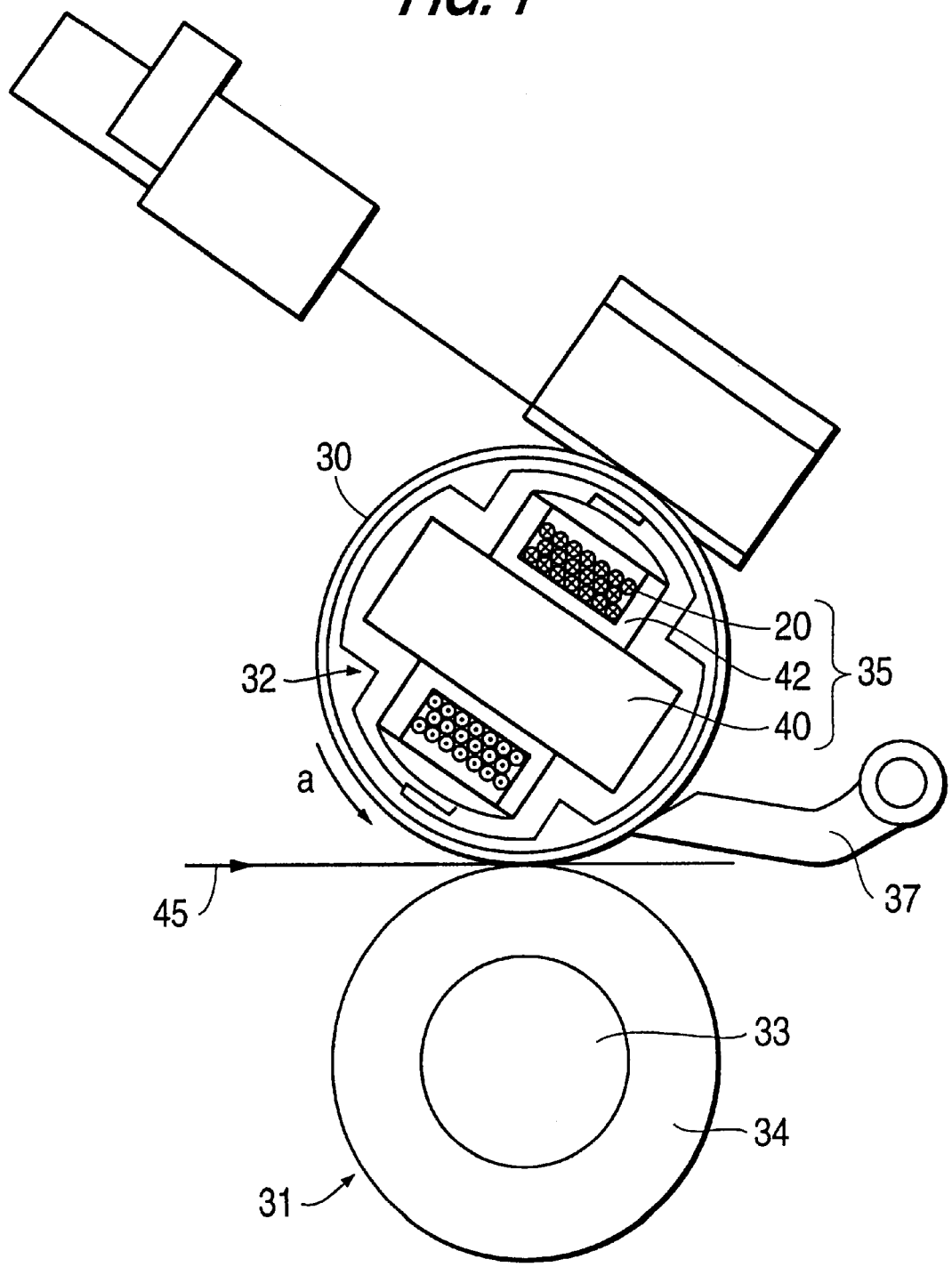
FIG. 1 is a cross-sectional view showing the outline of the construction of an induction heat fusing apparatus.

FIG. 1 is a cross-sectional view showing the outline of the construction of an induction heat fusing apparatus.

As shown in FIG. 1, the induction heat fusing apparatus incorporated in an image forming device such as a copier or printer has fusing roller 30 located such that it may be driven to rotate in the direction indicated by arrow a and pressure roller 31 that presses against fusing roller 30 and rotates due to the rotation of fusing roller 30. Fusing roller 30 is a conductive hollow cylindrical pipe, and comprises a conductive member such as a carbon steel tube, stainless alloy tube or aluminum alloy tube, for example. It is coated on the outer surface with fluorocarbon resin such that a heat-resistant lubricating layer is formed on the surface. It is desirable for fusing roller 30 to be composed of a conductive magnetic member as described above. Pressure roller 31 comprises silicone rubber layer 34, a surface lubricating heat-resistant rubber layer, formed around core 33.

Multiple coil assemblies 35 to generate an induced current in fusing roller 30 to cause said roller to generate heat are held by holder 32 inside fusing roller 30 with a small gap between them and the inner surface of fusing roller 30.

Sliding bearings are formed on either end of fusing roller 30, which is rotatably mounted to the fusing unit frame. A drive gear not shown in the drawings is also fixed to one end of fusing roller 30, which is driven to rotate by means of a drive source such as a motor connected to this drive gear. In contrast, holder 32 is fixed to the fusing unit frame and does not rotate even when fusing roller 30 rotates.

Figure 3:
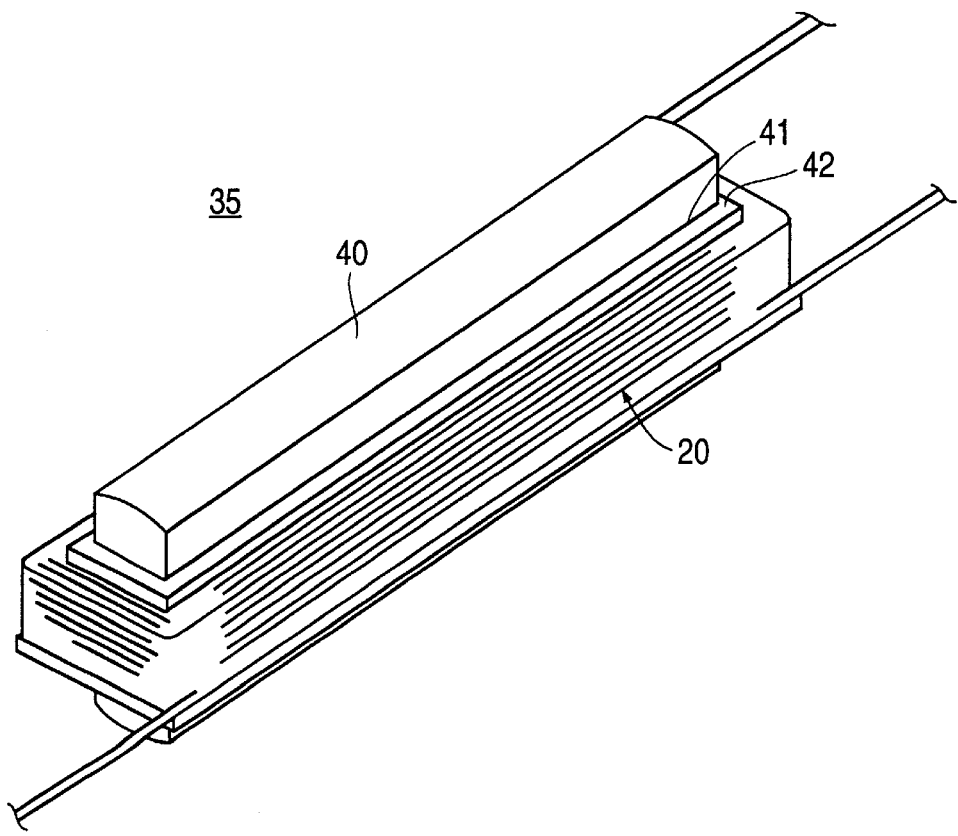
FIG. 3 is a perspective view of said coil assembly.

As shown in FIG. 3, coil assembly 35 has bobbin 42 and core 40. Coil assembly 35 comprises core 40, which is inserted in pierced hole 41 that has a rectangular opening and is located in bobbin 42, and copper wire 20 wrapped around bobbin 42. For copper wire 20, either a single or litz copper wire with a diameter of 0.8 mm and having a fused layer and an insulating layer is used. Copper wire 20 is wrapped around bobbin 42 in the direction of the rotational axis of fusing roller 40.

Core 40 comprises, for example, a ferrite core or a laminated core. Bobbin 42 is formed using, for example, ceramic or a heat-resistant insulating engineering plastic, and performs the role of maintaining the shape of the wrapped copper wire by holding it.

Figure 2:
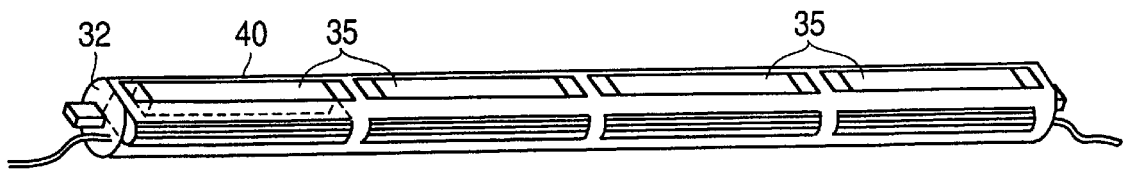
FIG. 2 is a perspective view showing the manner in which the coil assemblies of the induction heat fusing apparatus of FIG. 1 are held.

As shown in FIG. 2, holder 32 in which coil assemblies 35 are housed has a hollow cylindrical shape, and multiple holes piercing through holder 32 are formed on its sides as well as its top and bottom. Protrusions are also located at either end of holder 32 to attach holder 32 to the main body of the apparatus. This holder 32 is made of a material having heat-resistant and insulating properties, such as PPS (polyphenylene sulfide) or a liquid crystal polymer, for example. Coil assemblies 35 are incorporated into holder 32 by inserting bobbins 42 in the side holes in holder 32 and then inserting cores 40 in the top and bottom holes. Multiple coil assemblies 35 are electrically connected in series inside holder 32, and lead wires to carry high frequency current to these coils protrude from the ends of holder 32. High frequency current is supplied to the coils from the power supply circuit described below via these lead wires. As a result, induction current is generated in fusing roller 30 and fusing roller 30 generates heat.

The induction heat fusing apparatus constructed as described above operates in the manner described below.

First, sheet 45 that holds a non-fused toner image is fed from the left in FIG. 1 toward the nipping area between fusing roller 30 and pressure roller 31. Sheet 45 is fed through the nipping area while the heat of fusing roller 30 and the pressure from rollers 30 and 31 are applied to it. As a result, the non-fused toner becomes fused and a fused toner image is formed on sheet 45. As shown in FIG. 1, sheet 45 that has passed the nipping area is forcibly separated from fusing roller 30 by separating claw 37 located such that its tip comes into contact with the surface of fusing roller 30, and is then conveyed to the right in FIG. 1. This sheet 45 is conveyed by a paper ejection roller not shown in the drawings and ejected onto a paper exit tray.

Separating claw 37 is made, like the sliding bearings of fusing roller 30, of a heat-resistant low-friction engineering plastic, etc.

Figure 4:
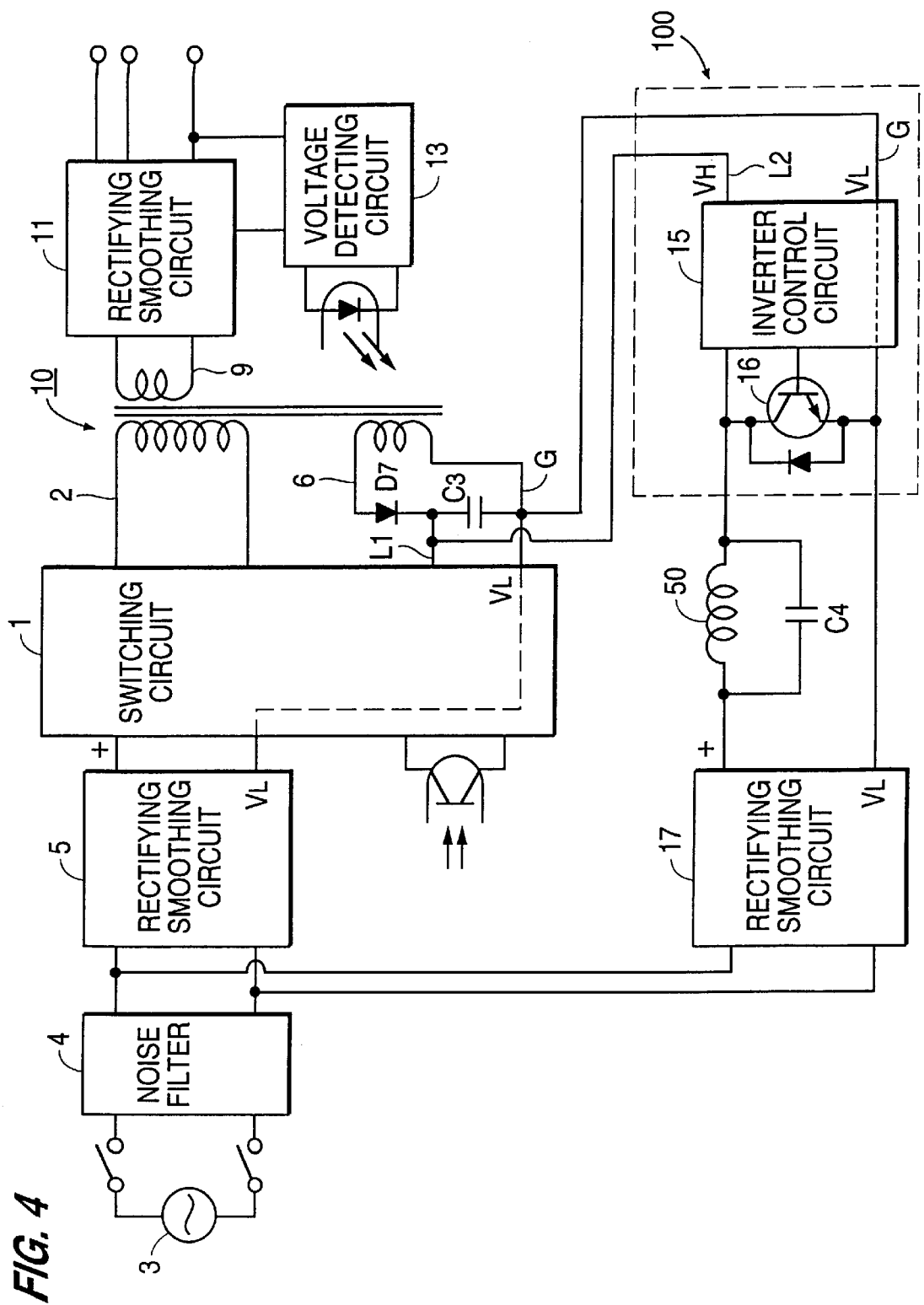
FIG. 4 is a drawing showing the power supply circuit of the image forming device in which the induction heat fusing apparatus is employed.

The power supply unit of the image forming device in which the induction heat fusing apparatus is incorporated will be explained below. FIG. 4 is a circuit diagram showing the construction of this power supply unit.

In FIG. 4, noise filter 4 is used to eliminate the noise from commercial power supply 3. It eliminates the noise from the AC voltage from commercial power supply 3, and outputs AC voltage to rectifying smoothing circuits 5 and 17. Rectifying smoothing circuits 5 and 17 generate smoothed DC voltage from the AC voltage from which noise was eliminated by noise filter 4.

Figure 5:
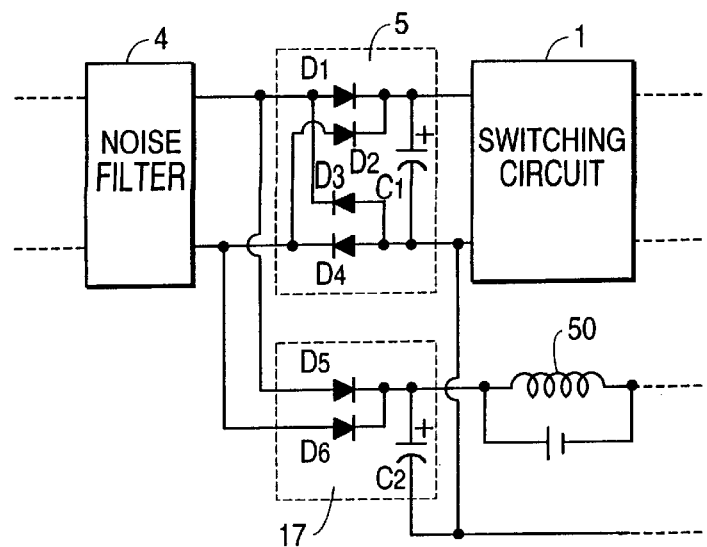
FIG. 5 is a drawing showing the details of the rectifying smoothing circuit of FIG. 4.

The specific circuit construction of these rectifying smoothing circuits 5 and 17 is as shown in FIG. 5. Rectifying smoothing circuit 5 comprises a bridge circuit connecting four diodes D1 through D4, and has smoothing condenser C1 connected to its output side in a parallel fashion. Rectifying smoothing circuit 17 is a circuit in which two diodes D5 and D6 are connected in series in a reverse direction, and which has smoothing condenser C2 connected to its output side in a parallel fashion. Rectifying smoothing circuit 17 shares a ground with rectifying smoothing circuit 5. Consequently, the two diodes D5 and D6 of rectifying smoothing circuit 17 form a bridge circuit together with diodes D3 and D4 of rectifying smoothing circuit 5.

Switching circuit 1 performs switching of the DC voltage output from rectifying smoothing circuit 5 and outputs AC voltage of a desired frequency from its output terminal. Transformer 10 transforms the AC voltage output from switching circuit 1 via primary coil 2 and secondary coil 9, and then outputs the resulting transformed voltage to rectifying smoothing circuit 11.

Rectifying smoothing circuit 11 converts the voltage induced in secondary coil 9 into DC voltage with little ripple, and outputs said voltage to drive systems such as motors or solenoids in the image forming device, or to the paper feed drive system, for example.

The DC voltage output from rectifying smoothing circuit 11 is detected by voltage detecting circuit 13, and switching circuit 1 controls its switching operation based on the detection results of voltage detecting circuit 13 such that said voltage is maintained at a fixed level.

Supplementary coil 6 is located in transformer 10 and generates power supply voltage used in the switching control operation performed by switching circuit 1. The voltage from supplementary coil 6 is supplied to inverter control circuit 15 of inverter circuit 100. Inverter control circuit 15 generates, by means of this voltage supplied from supplementary coil 6, a control signal to perform switching of inverter circuit 100.

In other words, the voltage induced in supplementary coil 6 undergoes half-wave rectification by means of diode D7, and at the same time, it is smoothed by condenser C3. The voltage is then supplied to switching circuit 1 and inverter control circuit 15.

Power supply wire L1 and ground wire G on the plus side of switching circuit 1 are connected respectively to power supply wire L2 and ground wire G on the plus side of inverter control circuit 15. This means, therefore, that switching circuit 1 and inverter control circuit 15 share the same ground. By having them share the ground in this way, they can share diode D7 as well.

In addition, because the ground of inverter control circuit 15 is connected to the ground of rectifying smoothing circuit 17 and the ground of rectifying smoothing circuit 17 is connected to the ground of rectifying smoothing circuit 5 as described above, the grounds on the input and output sides of switching circuit 1, as well as the ground on the input side of inverter control circuit 15, are the same.

As a result, rectifying smoothing circuit 17 can perform full-wave rectification via diodes D5 and D6 only by using diodes D3 and D4 of rectifying smoothing circuit 5.

In this induction heat fusing apparatus, it is necessary to impress high frequency voltage to multiple coil assemblies 35 (they will be shown collectively as heating coils 50 in the drawings) described above in order to increase the heating efficiency. This is particularly true in order to obtain adequate heating efficiency when using small heating coils 50 that can be housed inside fusing roller 30 as described above. This high frequency voltage is generated by inverter control circuit 15. This inverter control circuit 15 comprises a small transistor, a comparator integrated circuit and a dedicated controller integrated circuit, for example.

Voltage whose frequency and duty ratio are determined via the switching of transistor 16 that serves as a high frequency power supply means is impressed to heating coils 50 from rectifying smoothing circuit 17. The current that flows to these heating coils 50 becomes a sinusoidal current due to the action of condenser C4. The switching operation of this transistor 16 is controlled by inverter control circuit 15.

While the embodiment described above uses a diode only as the semiconductor element to perform rectification, it may be replaced with a switching element such as a thyristor, or a diode and a thyristor may be used together. A thyristor may also be used in place of transistor 16.

The control circuit for the induction heat fusing apparatus constructed as described above operates essentially as described below.

The voltage from commercial power supply 3 from which the noise component is eliminated by means of noise filter 4 is transformed into DC voltage by diodes D1 through D4 of rectifying smoothing circuit 5 and by diodes D5 and D6 of rectifying smoothing circuit 17 (shared diodes D3 and D4) and is supplied to switching circuit 1 and inverter control circuit 100. Switching circuit 1 impresses AC voltage of a desired frequency to primary coil 2 of transformer 10 through a switching operation, and generates an AC voltage of a desired level in secondary coil 9 and supplementary coil 6. The AC voltage generated in secondary coil 9 is transformed into DC voltage by rectifying smoothing circuit 11 and supplied to the paper feed drive system described above, etc. The AC voltage generated in supplementary coil 6 is rectified and smoothed by diode D7 and condenser C3 and supplied to switching circuit 1 and inverter control circuit 15, and becomes a power supply for generating a signal to control the switching operations of switching circuit 1 and inverter circuit 100. Inverter control circuit 15 generates a control signal to allow transistor 16 to perform switching at desired intervals using this voltage. The voltage impressed from rectifying smoothing circuit 17 to heating coils 50 is switched via the switching operation of this transistor 16, and high frequency voltage is impressed to heating coils 50. As a result, heating coils 50 cause fusing roller 30 to generate heat.

Where switching circuit 1 and inverter control circuit 15 share a ground in this manner, the sharing of rectifying diodes is made possible, as a result of which the number of parts and components may be reduced to the extent of the sharing.

Figure 6:
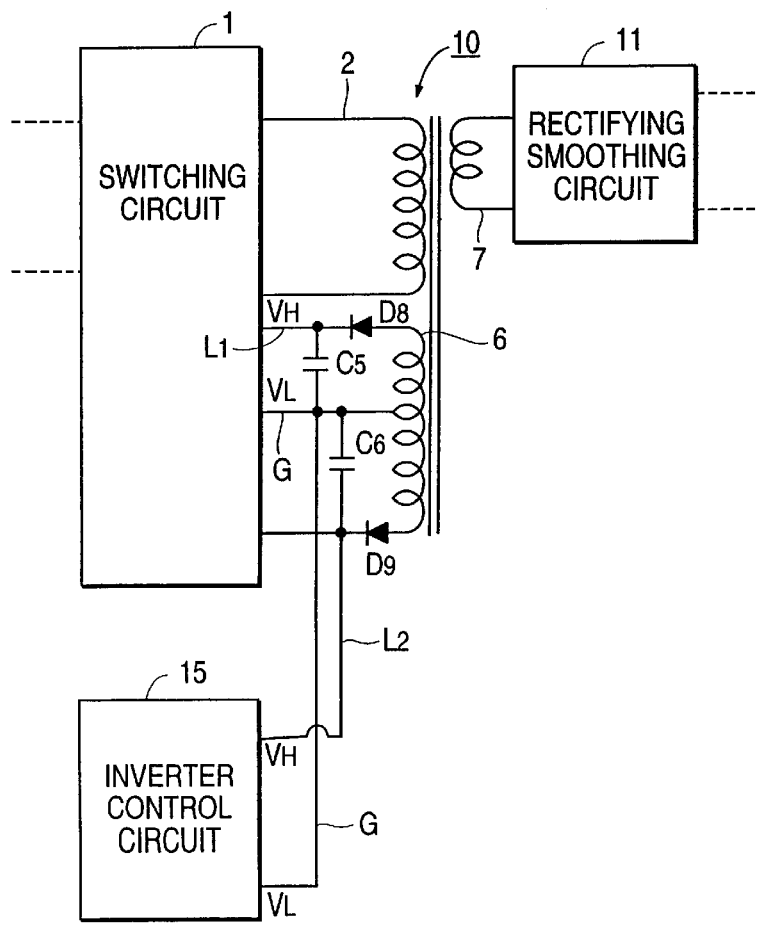
FIG. 6 is a circuit diagram showing a variation of the power supply circuit of FIG. 4.

The circuit shown in FIG. 6 is a circuit diagram showing a variation of the power supply circuit for the induction heat fusing apparatus shown in FIG. 4. The circuit shown in FIG. 6 is used in place of the circuit for supplementary coil 6 of the power supply circuit of FIG. 4.

In other words, minus power supply wire G that serves as the ground for switching circuit 1 and inverter control circuit 15 is connected to supplementary coil 6 at a location between its two ends, such that voltage is supplied to switching circuit 1 via the rectifying smoothing circuit comprising diode D8 and condenser C5, and is supplied to inverter control circuit 15 via the rectifying smoothing circuit comprising diode D9 and condenser C6.

Using this circuit construction, different voltages may be supplied to switching circuit 1 and inverter control circuit 15 even as they share the same ground, and any voltage corresponding to the characteristics of the controller integrated circuit or switching element (transistor or thyristor) used in switching circuit 1 and inverter control circuit 15 may be supplied to said circuits. The supply of different voltages to switching circuit 1 and inverter control circuit 15 may be achieved by changing the number of loops in the supplementary coil from ground wire G to either end of the coil, or by connecting ground wire G to the supplementary coil at an appropriate position of said supplementary coil.

While a transistor is used as the element that performs half-wave rectification in this circuit, a thyristor may naturally be used instead.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A power supply unit used in an image forming apparatus having an induction heat fusing device, said power supply unit comprising:

a first rectifying circuit which rectifies AC voltage from a power supply to generate DC voltage;

an inverter circuit which generates a high frequency voltage to be applied to a coil of the induction heat fusing device by switching the DC voltage from said first rectifying circuit;

a second rectifying circuit which rectifies AC voltage from said power supply to generate DC voltage;

a switching circuit which switches the DC voltage from said second rectifying circuit and generates AC voltage; and a transformer which receives the AC voltage from the switching circuit and outputs a transformed voltage to be applied to a component of the image forming apparatus;

wherein said inverter, second rectifying circuit and switching circuit are connected to a common ground line.

2. The power supply unit as claimed in claim 1, wherein said first and second rectifying circuits share some rectification elements.

3. The power supply unit as claimed in claim 2, wherein said shared rectification element includes a diode.

4. The power supply unit as claimed in claim 1, wherein said first rectifying circuit is also connected to said common ground line.

5. A power supply unit used in an image forming apparatus having an induction heat fusing device, said power supply unit comprising:

a first rectifying circuit which rectifies AC voltage from a power supply to generate DC voltage;

an inverter circuit which generates a high frequency voltage to be applied to a coil of the induction heat fusing device by switching the DC voltage from said first rectifying circuit;

a second rectifying circuit which rectifies AC voltage from said power supply to generate DC voltage;

a switching circuit which switches the DC voltage from said second rectifying circuit and generates AC voltage; and a transformer which receives the AC voltage from the switching circuit and outputs a transformed voltage to be applied to a component of the image forming apparatus, said transformer including a supplementary coil to generate a transformed voltage for controlling a switching operation of said switching circuit;

wherein said inverter, second rectifying circuit, switching circuit and supplementary coil are connected to a common ground line.

6. The power supply unit as claimed in claim 5, wherein said first and second rectifying circuits share some rectification elements.

7. The power supply unit as claimed in claim 6, wherein said shared rectification element includes a diode.

8. The power supply unit as claimed in claim 5, wherein said first rectifying circuit is also connected to said common ground line.

9. A power supply unit comprising:

a first rectifying circuit which rectifies AC voltage from a power supply to generate DC voltage;

an inverter circuit which generates a high frequency voltage by switching the DC voltage from said first rectifying circuit;

a second rectifying circuit which rectifies AC voltage from said power supply to generate DC voltage;

a switching circuit which switches the DC voltage from said second rectifying circuit and generates AC voltage; and a transformer which receives the AC voltage from the switching circuit and outputs a transformed voltage;

wherein said inverter, second rectifying circuit and switching circuit are connected to a common ground line.

10. The power supply unit of claim 9, wherein said first and second rectifying circuits share some rectification elements.

11. The power supply unit of claim 10, wherein said shared rectification elements include a diode.

12. The power supply unit of claim 9, wherein said first rectifying circuit is also connected to said common ground.

* * * * *